United States Patent
Zhou et al.

(10) Patent No.: US 10,482,666 B2
(45) Date of Patent: Nov. 19, 2019

(54) DISPLAY CONTROL METHODS AND APPARATUSES

(71) Applicant: BEIJING ZHIGU RUI TUO TECH CO., LTD., Beijing (CN)

(72) Inventors: Liang Zhou, Beijing (CN); Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 57 days.

(21) Appl. No.: 15/570,893

(22) PCT Filed: May 4, 2016

(86) PCT No.: PCT/CN2016/080986
§ 371 (c)(1),
(2) Date: Oct. 31, 2017

(87) PCT Pub. No.: WO2016/177326
PCT Pub. Date: Nov. 10, 2016

(65) Prior Publication Data
US 2018/0293799 A1 Oct. 11, 2018

(30) Foreign Application Priority Data
May 4, 2015 (CN) .......................... 2015 1 0221009

(51) Int. Cl.
*G06T 19/00* (2011.01)
*H04N 13/122* (2018.01)
(Continued)

(52) U.S. Cl.
CPC ............ *G06T 19/006* (2013.01); *G09G 5/00* (2013.01); *H04N 13/122* (2018.05);
(Continued)

(58) Field of Classification Search
None
See application file for complete search history.

(56) References Cited

U.S. PATENT DOCUMENTS

2012/0068913 A1  3/2012 Bar-Zeev et al.
2012/0326948 A1  12/2012 Crocco et al.
(Continued)

FOREIGN PATENT DOCUMENTS

CN  103500465 A  1/2014
CN  103927966 A  7/2014
WO  2014/156033 A1  10/2014

OTHER PUBLICATIONS

International Search Report and Written Opinion for Application No. PCT/CN2016/080986, dated Aug. 10, 2016, 9 pages.

*Primary Examiner* — Michelle Chin
(74) *Attorney, Agent, or Firm* — Sheppard Mullin Richter & Hampton LLP

(57) ABSTRACT

Embodiments of the present application disclose various display control methods and apparatuses. One of the methods comprises: determining at least local virtual enhancement information of an expected display environment of virtual content according to optical parameters of the virtual content; and controlling a display device to display the virtual content and the at least local virtual enhancement information of the expected display environment. The present application is favorable for enhancing a fusion display effect and improving user experience.

22 Claims, 3 Drawing Sheets

(51) Int. Cl.
   *G09G 5/00*   (2006.01)
   *G06F 3/14*   (2006.01)
   *G09G 3/00*   (2006.01)
   *G02B 27/01*   (2006.01)

(52) U.S. Cl.
   CPC .. *G02B 27/0101* (2013.01); *G02B 2027/0118* (2013.01); *G06F 3/14* (2013.01); *G09G 3/003* (2013.01); *G09G 2320/0626* (2013.01); *G09G 2320/0666* (2013.01); *G09G 2340/10* (2013.01); *G09G 2340/14* (2013.01); *H04N 2213/001* (2013.01)

(56) References Cited

U.S. PATENT DOCUMENTS

| | | |
|---|---|---|
| 2014/0003762 A1 | 1/2014 | MacNamara |
| 2014/0125668 A1 | 5/2014 | Steed et al. |
| 2014/0340287 A1 | 11/2014 | Achilefu et al. |
| 2014/0343699 A1 | 11/2014 | Engelen et al. |
| 2016/0033770 A1* | 2/2016 | Fujimaki ............... G06T 19/006 345/8 |
| 2017/0076475 A1 | 3/2017 | Zhou |

* cited by examiner

DISPLAY CONTROL METHODS AND APPARATUSES

CROSS-REFERENCE TO RELATED APPLICATIONS

This application is a National Phase Application of International Application No. PCT/CN2016/080986, filed on May 4, 2016, which claims the priority to and benefit of Chinese Patent Application No. 201510221009.X, filed on May 4, 2015, and entitled "Display Control Methods and Apparatuses", Both of the above-referenced applications are incorporated into the present application by reference herein in their entirety.

TECHNICAL FIELD

The present application relates to the technical field of display, in particular to various display control methods and apparatuses.

BACKGROUND

A Virtual Reality (VR) technology provides immersion for a user in an interactive three dimensional environment (also known as Virtual Environment (VE)) capable of being generated on a computer, and thus causes the user to generate an immersive feeling in the virtual environment.

An Augmented Reality (AR) technology is a new technology developed from the virtual reality technology, is capable of "placing" virtual content generated by the computer, such as virtual objects, scenes or system prompt information in a real environment, and presents the user with a "new environment" fusing the virtual contents with the real environment in a whole by means of a display device, hence, augmented reality is realized.

SUMMARY

The following briefly describes the present application, so as to provide a basic understanding of some aspects of the present application. It should be understood that, the brief description is not an exhaustive brief description of the present application. The description is neither intended to determine key or important parts of the present application, nor intended to limit the scope of the present application. An objective thereof is merely to give some concepts in a simplified manner as a preface for more detailed description hereinafter.

The present application provides various display capture control methods and apparatuses.

In one aspect, an embodiment of the present application provides a display control method, comprising:

determining at least local virtual enhancement information of an expected display environment of virtual content according to optical parameters of the virtual content; and controlling a display device to display the virtual content and the at least local virtual enhancement information of the expected display environment.

In another aspect, an embodiment of the present application further provides a display control apparatus, comprising:

a virtual enhancement information determining module, configured to determine at least local virtual enhancement information of an expected display environment of virtual content according to optical parameters of the virtual content; and a first display control module, configured to control a display device to display the virtual content and the at least local virtual enhancement information of the expected display environment.

According to technical solutions provided by embodiments of the present application, at least local virtual enhancement information of an expected display environment of virtual content is determined according to optical parameters of the virtual content, in this way, the optical parameters, affecting a user visual effect, of the virtual content and the at least local virtual enhancement information of the expected display environment, respectively are close as much as possible or even same, the display device is controlled to display the virtual content and the virtual enhancement information, to cause the virtual content saw by a user and at least local virtual enhancement information of an expected real environment to be better fused, a fusing display effect is enhanced and user experience is improved.

The following describes in detail alternative embodiments of the application with reference to accompanying drawings, to make these and other advantages of the present application more obvious.

BRIEF DESCRIPTION OF THE DRAWINGS

The present application may be understood better with reference to the following description in combination with accompanying drawings, wherein a same or similar accompanying drawing mark is used in all the accompanying drawings to represent a same or similar component. The accompanying drawings together with the following detailed description are comprised in the specification and constitute a part of the specification, and are used to further illustrate alternative embodiments of the present application and explain the principle and advantages of the present application. In the accompanying drawings.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancing an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners must be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail specific implementation manners of the present application with reference to the accompanying drawings (a same label represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logical sequence among them.

Figure 1:
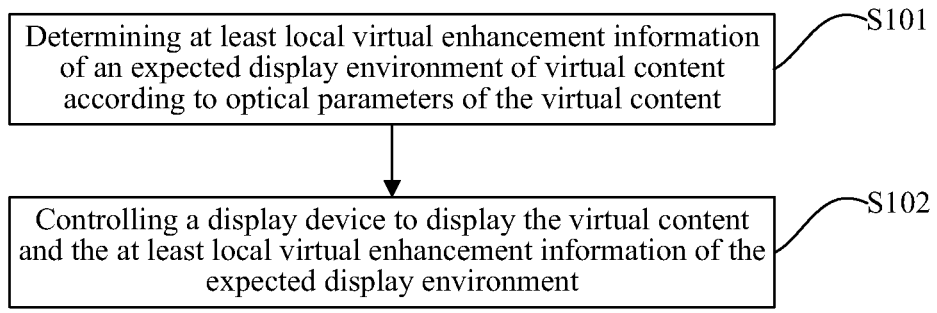
FIG. 1 is a flowchart of a display control method according to an embodiment of the present application.

FIG. 1 is a flowchart of a display control method according to an embodiment of the present application. The display control method provided by this embodiment of the present application may be executed by certain display control apparatus, and the display control apparatus can perform display control by executing the display control method during a display application process, comprising but not limited to: display and playing of image, video and other virtual content. There is no limit to the manners in which the display control apparatus is embodied. For example, the display control apparatus may be an independent part, and the part cooperates with a display device in communication; or the display control apparatus may be a functional module integrated in a display device, which is not limited in this embodiment of the present application.

Specifically, as shown in FIG. 1, a display control method provided by this embodiment of the present application comprises:

S101: Determining at least local virtual enhancement information of an expected display environment of virtual content according to optical parameters of the virtual content; and S102: Controlling a display device to display the virtual content and the at least local virtual enhancement information of the expected display environment.

The expected display environment is a real display environment where the virtual content is expected to be displayed, through display control, the virtual content does not really exist in the expected display environment, and the virtual content can be made by computer synthesis; or the virtual content is content really collected in another real environment, the really collected content may server as the virtual content to be migrated and displayed in one expected display environment; etc.

The virtual content has certain optical parameters per se, the optical parameters reflect generation of the virtual content or optical environment information of a collection scene, and visual effects of the virtual content with different optical parameters for a user are possibly different: for example, the visual effects of the virtual content acquired in a bright environment and the same virtual content acquired in a dark environment for the user have big difference; for another example, the visual effects of the virtual content acquired in a warm-toned environment and the same virtual content acquired in a cool-toned environment for the user have big difference; for another example, the visual effects of the virtual content acquired in a super-saturated environment and the same virtual content acquired in a common-saturated environment for the user have big difference.

In a practical application process, by controlling a display device to display the virtual content in certain real environment, a virtual-real fusion reality-augmented display effect may be acquired. However, the inventor of the present application found during implementation of this embodiment of the present application that if the optical parameters of the displayed virtual content and the whole or local optical parameters of a real environment are not matched or have big difference, fusion of the virtual content and real environment is affected to cause the displayed content to seem to be "unreal" in the real environment, and a display effect is affected.

For this purpose, according to the technical solutions of the embodiment of the present application, at least local virtual enhancement information of the expected display environment of the virtual content can be determined according to the optical parameters of the virtual content, in this way, the optical parameters, affecting a user visual effect, of the virtual content and the at least local virtual enhancement information of the expected display environment, respectively, are close as much as possible or even same, the display device is controlled to display the virtual content and the virtual enhancement information, to cause the virtual content saw by a user and at least local virtual enhancement information of an expected real environment to be better fused, a fusing display effect is enhanced and user experience is improved.

According to the technical solutions of the embodiment of the present application, by displaying and controlling the virtual content, the finally really displayed environment may comprise but are not limited to: the expected display environment, a virtual environment corresponding to the expected display environment or a virtual-real fusion environment corresponding to the expected display environment, that is to say, by displaying and controlling the virtual content, the finally really displayed environment may be same as or related to the expected display environment, and an implementation manner is very flexible.

Optionally, in a display process of the virtual content, the at least local virtual enhancement information of expected display environment may serve as the enhancement information of the expected display environment, the user can see the expected display environment, the virtual enhancement information and the virtual content, in this way, by the expected display environment after supplement display of the virtual enhancement information, it seems to the user that the optical parameters thereof and the optical parameters of the virtual content are better matched; Or, optionally, in the display process of the virtual content, the virtual enhancement information of the expected display environment may serve as substitution of the expected display environment, in other words, the virtual enhancement information is equivalent to the virtual environment corresponding to the expected display environment and established according to the optical parameters of the virtual content, through common display of the virtual content and the virtual environment, the two are better fused, a fusion display effect is enhanced and user experience is improved.

Optionally, before determining the expected display environment of the virtual content according to optical parameters of the virtual content, the method also comprises: determining the difference between the optical parameters of the virtual content and at least local optical parameters of the expected display environment. Accordingly, determining at least local virtual enhancement information of the expected display environment of the virtual content according to the optical parameters of the virtual content comprises: determining, responding to at least local difference of the expected display environment to exceed a preset permissible range, at least local virtual enhancement information of the expected display environment according to the optical parameters of the virtual content.

The preset permissible range can be determined according to actual demands, for example, a relatively wide or thin preset permissible range of the optical parameter difference can be determined according to precision requirements, application requirements or the like of fusion display. The optical parameters may comprise but are not limited at least one of the following: brightness, color temperature and saturation. The brightness, color temperature and saturation have bigger interference on a visual effect of the user and have relatively simple adjustment manners. The optical parameters of the virtual content and the whole or local optical parameters of the expected display environment are compared, for example, average bright, color temperature and/or saturation of the virtual content are compared with the whole or local average bright, color temperature and/or saturation of the expected display environment, the difference of the two is determined according to a comparison result, if the difference of the two exceeds the preset permissible range, it is indicated that the difference is too much big or does not meet preset precision requirements, application requirements or the like, in this situation, if the virtual content is directly displayed in the expected display environment, relative to the visual effect of the user, the virtual content is difficultly fused together with the expected display environment, sense of reality is not high, therefore, a technical solution provided by the embodiment of the present application can be adopted, at least local virtual enhancement information of the expected display environment is determined according to the optical parameters of the virtual content, the common display of the virtual content and at least local virtual enhancement information of the expected display environment is used to improve a fusion display effect of the virtual effect and a real display environment of the virtual content, the vision sense of reality of the user is improved, and user experience is improved. In this solution, a comparison result of the difference of the optical parameters of the virtual content and the at least local optical parameters of the expected display environment and the preset permissible range is used as a triggering condition of displaying the at least local virtual enhancement information of the expected display environment or not in a process of displaying the virtual content, to cause the solution to have greater pertinence, and meet practical application requirements on diversity.

Further optionally, the display control method also comprises: controlling, responding to at least local difference of the expected display environment to not exceed a preset permissible range, the display device to display the virtual content. Specifically, the optical parameters of the virtual content and at least optical parameters of the expected display environment are compared, for example, average bright, color temperature and/or saturation of the virtual content are compared with the whole or local average bright, color temperature and/or saturation of the expected display environment, the difference of the two is determined according to a comparison result, if the difference of the two does not exceed the preset permissible range, it is indicated that the difference is not big or does not affect preset precision requirements, application requirements or the like, relative to the visual effect of the user, the whole or local fusion effect of the virtual content and the expected display environment is better or acceptable, in this situation, the virtual content is directly displayed in the expected display environment without the need of displaying the at least local virtual enhancement information of the expected display environment, and the reality-augmented display of the expected display environment is realized. In this solution, whether the virtual enhancement information of the expected display environment needs to be displayed or not can be determined according to actual demands, that is to say, display control is carried out according to actual demand discrimination, thereby a required fusion display effect is achieved with complexity as low as possible and a practical application requirement on diversity is met.

According to the technical solution provided by the embodiment of the present application, a determining manner of the at least local virtual enhancement information of the expected display environment is very flexible.

For example, values of the optical parameters of the virtual content are used as target values, the difference between the values of the optical parameters of the expected display environment and the target values is determined, compensation information such as brightness compensation information, color temperature compensation information and/or saturation compensation information is generated according to the difference, the compensation information and the virtual content are displayed together to cause the effect of the brightness, color temperature and/or saturation of the expected display environment for the user after the expected display environment is combined with the compensation information, to be close to as much as possible or even same as the effect, of the brightness, color temperature/ and or saturation of the virtual content for the user, and thereby, a fusion display effect is enhanced.

For another example, at least local image of the expected display environment can be acquired, optical parameters of the image are adjusted according to the optical parameters of the virtual content, and the adjusted image is of the at least virtual enhancement information of the expected display environment; then, a display device is controlled to display the virtual content together with the image, in this way, the displayed image is equivalent to establishment of a virtual environment corresponding to at least local of the expected display environment, and optical parameters such as brightness, color temperature and/or saturation of the virtual environment are matched with the optical parameters of the virtual content to cause the virtual content saw by the user and the virtual environment presented by the image to be better integrally fused, and a fusion display effect and sense of reality are enhanced.

Figure 2:
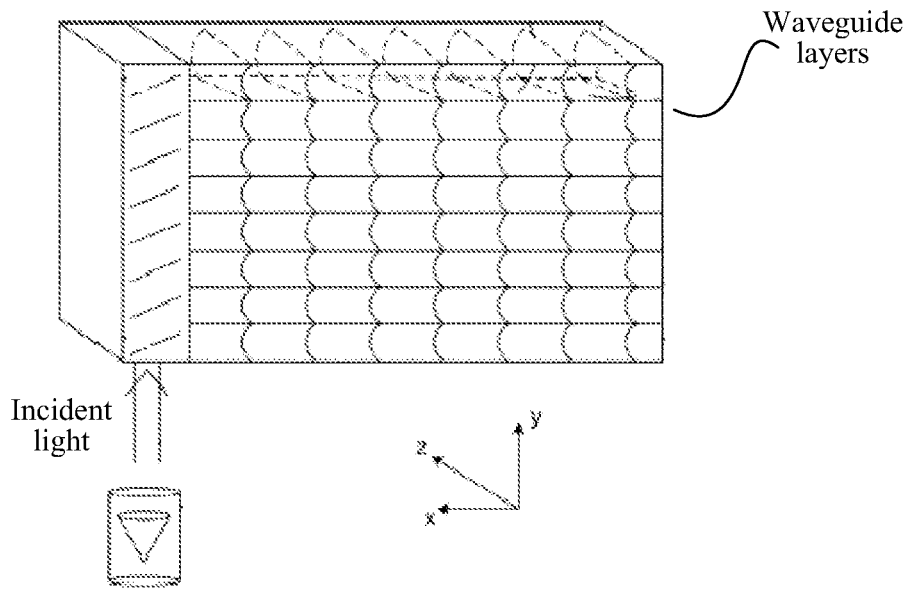
FIG. 2 is a structure example of waveguide layers according to an embodiment of the present application.

Further optionally, controlling a display device to display the virtual content and the at least local virtual enhancement information of the expected display environment, comprises: acquiring object depth information of the expected display environment; controlling the display device to display the virtual content and respectively display respective parts, corresponding to the corresponding object(s) of the expected display environment, in the image to the corresponding depth(s) according to the object depth information. The expected display environment comprises one or more objects, the object(s) may comprise but are not limited certain real objects in the expected display environment, such as a desk, a chair and a bookshelf. Different objects are possibly distributed in positions of same or different depths of the expected display environment, and at least local object depth information of the expected display environment can be acquired. An acquiring manner of the object depth information is very flexible, for example but not limited to, by acquiring a depth map of the expected display environment, the depth information of respective objects in the expected display environment can be acquired based on the depth map; or respective object depths can be determined according to distribution positions of respective objects in the expected display environment; and the like. After the object depth information is acquired, respective parts, corresponding to corresponding parts of the expected display environment, in the image are projected to depth positions corresponding to the objects, in this way, the depth distribution of the objects displayed in the virtual environment and real depth distribution of the corresponding real objects in the expected display environment are close as much as possible or even same, to cause a visual effect of the virtual content saw by the user in the virtual environment to be just like that of the virtual content displayed in the expected display environment (real environment), in addition, since the optical parameters of the virtual environment are matched with the optical parameters of the virtual content, in terms of the display of the virtual content in the virtual environment, in a case of the visual effect of the user, a better fusion display effect is realized, and user experience is favorably improved, wherein, respectively displaying respective parts, corresponding to corresponding objects of the expected display environment, in the image to the corresponding depths can be realized based on a display device with a depth projection display capability, and the display device with the depth projection display capability comprises but is not limited to a 3D display device, an optical field display device, a near-to-eye display device and the like, in an optional implementation manner, as shown in FIG. 2, the display device comprises different waveguide layers distributed along Z axis (the condition of one certain waveguide layer is shown in the FIG.), the different waveguide layers are configured to reconfigure optical field information on planes of different depths, imaging light of respective parts, corresponding to corresponding objects of the expected display environment, in at least local image of the expected display environment after optical parameter adjustment can be incident to the waveguide layers of corresponding depths, each waveguide layer comprises a plurality of light splitters and a micro-curve reflection mirror, incident light images after transmission of the waveguide layers, which is equivalent to reestablishment of light field information of corresponding objects on a plane with specific depth, through transmitting respective parts, corresponding to corresponding objects of the expected display environment, in the image by the different waveguide layers, object display contents corresponding to respective object depths can be reestablished in space to cause the displayed virtual environment corresponding to the image to seem to have the objects and depth distribution of the objects similar or even same as those of the expected display environment.

Optionally, the display device has but is not limited to the performance of adjusting ambient light transmittance, wherein, a specific structure of the display device with the performance of adjusting the ambient light transmittance is not limited, for example, the display device may comprises a transparent display screen, the transparent display screen is provided with a liquid crystal layer, by using the property of rotation of liquid crystal under the action of an electric field, polarization of the liquid crystal and the like, the transmittance of the ambient light through the liquid crystal layer is changed, for example, when the liquid crystal layer is under a first electric field, the transmittance is 100%, while when the liquid crystal layer is under a second electric field, the transmittance is 0 and the like. Optionally, in the situation that there is not need of the display of the virtual enhancement information, or no need of realizing an overlapping display effect of the virtual enhancement information and the expected display environment (real environment) or the like, the transmittance of the display device is adjusted to cause the display device to fully or proportionally transmit the ambient light, in this way, during the projection display of the virtual content or the virtual content and the virtual enhancement information by the display device, the projection light displaying the information and the light of the expected display environment as real environment will enter user eyes, and commonly form overlapped images of an expected real environment and projection content (the virtual content or the virtual content and the virtual enhancement information) at user fundus, hence, a better reality-augmented effect is acquired. Further optionally, in the situation that the virtual enhancement information is required and is used for substituting the expected display environment, the transmittance of the display device can be adjusted to cause the display device to block transmission of the ambient light, in this way, during the projection display of the virtual content and the virtual enhancement information by the display device, projection light displaying the information enters user eyes, and forms overlapped images of the virtual enhancement information and the virtual content (light of the expected display environment as a real environment will not enter the user eyes) at user fundus, hence, a better reality-augmented effect is acquired.

The display device may be a far field display device (non-near-to-eye display device). Or, the display device may be a near-to-eye display device, and adoption of the near-to-eye display device causes the user to acquire a wider display range and relatively vivid visual effect.

A display manner of the display device comprises but are not limited to a see-through display manner and a non-transmission display manner, the non-transmission display manner comprises but is not limited to a blocking type display manner, a projection display manner is favorable for acquiring a reality-augmented display effect, while a non-transmission display manner such as the blocking display manner is favorable for acquiring a virtual reality display effect and an immersive user experience. Therefore, the difference of the optical parameters of the virtual content and the optical parameters of the expected display environment is determined and is compared with a preset permissible range, and the display manner of the display device such as the far field display device and the near-to-eye display device can be switched according to a comparison result.

For example, the difference responding to the whole expected display environment exceeds the preset permissible range, and the near-to-eye display device is controlled to display the virtual content and the whole virtual enhancement information of the expected display environment by adopting a non-transmission display manner. The solution is equivalent to that the near-to-eye display device displays the virtual content and the virtual environment corresponding to the whole virtual enhancement information of the expected display environment and the virtual content, projection light of the two is overlapped at the user for imaging, while the light of the expected display environment does not enter human eyes, and the human eyes can see an immersive virtual reality display effect.

For another example, the difference corresponding to the whole expected display environment does not exceed the preset permissible range, and the near-to-eye device is controlled to display the virtual content in a transmission display manner. The solution is equivalent to that the near-to-eye display device displays the virtual content to the expected display environment (real environment), imaging light of the virtual content and real ambient light of the expected display environment enter human eyes, and are overlapped at user fundus for imaging, thereby a reality-augmented display effect is acquired. In the solution, the display manner of the near-to-eye display device is switched according to optical parameters of the virtual content and optical parameter difference of the expected display environment, to cause that in the content saw by the user, the virtual content and the environment where the virtual content is really displayed are matched in optical parameter, and a fusion display effect is enhanced and user experience is improved.

For another example, the difference responding to the local expected display environment exceeds the preset permissible range, and the near-to-eye display device is controlled to display the virtual content and the local virtual enhancement information of the expected display environment in a transmission display manner. The solution is equivalent to that the near-to-eye display device displays the virtual content to the expected display environment real environment) and displays the local virtual enhancement information of the expected display environment to the expected display environment, imaging light of the virtual light, imaging light of the virtual enhancement information and real ambient light of the expected display environment enter human eyes, and image at human fundus in an overlapping manner, thereby a virtual-real fusion reality-augmented display effect is acquired. In the solution, compensation is performed on local optical parameters of the expected display environment through the virtual enhancement information to cause that in content saw by the user, the optical parameters of the virtual content are matched with the optical parameters of a real display environment (the environment after the virtual enhancement information is adopted to perform optical parameter compensation on the expected display environment) of the virtual content, thereby a fusion display effect is enhanced and user experience is improved.

It may be understood by a person skilled in the art that, in any one of the foregoing methods of specific implementation manners of the present application, the value of the serial number of each step described above does not mean an execution sequence, and the execution sequence of the steps should be determined according to the function and internal logical thereof, and should not constitute any limitation to the implementation procedure of the specific implementation manners of the present application.

Figure 3:
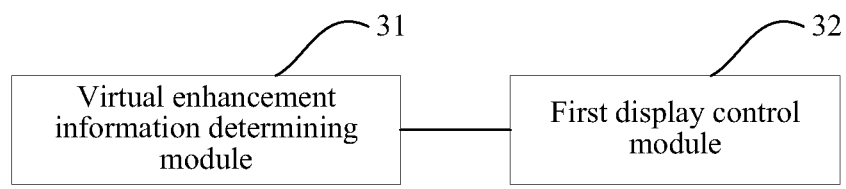
FIG. 3 is a logical block diagram of a display control apparatus according to an embodiment of the present application.

FIG. 3 is a logical block diagram of a display control apparatus according to an embodiment of the present application. As shown in the figure, the display control apparatus provided by the embodiment of the present application comprises: a virtual enhancement information determining module 31 and a first display control module 32.

The virtual enhancement information determining module 31 is configured to determine at least local virtual enhancement information of an expected display environment of virtual content according to optical parameters of the virtual content.

The first display control module 32 is configured to control a display device to display the virtual content and the at least local virtual enhancement information of the expected display environment.

According to the technical solution provided by embodiments of the present application, at least local virtual enhancement information of an expected display environment of virtual content is determined according to optical parameters of the virtual content, in this way, the optical parameters, affecting a user visual effect, of the virtual content and the at least local virtual enhancement information of the expected display environment, respectively are close as much as possible or even same, the display device is controlled to display the virtual content and the virtual enhancement information of the expected display environment, to cause the virtual content saw by a user and at least local virtual enhancement information of an expected real environment to be better fused, a fusing display effect is enhanced and user experience is improved.

There is no limit to the manners in which the display control apparatus is embodied. For example, the display control apparatus may be an independent part, and the part cooperates with a display device in communication; or the display control apparatus may be a functional module integrated in a display device, which is not limited in this embodiment of the present application. Optionally, the display device comprises but is not limited to a projection display device, a holographic display device, a near-to-eye display device and the like, if the near-to-eye display device is adopted to display the virtual content in a presenting region, it is convenient for a user to acquire an immersive experience, and improve a display effect of the virtual content.

The optical parameters may comprise but are not limited at least one of the following: brightness, color temperature and saturation. The brightness, color temperature and saturation have bigger interference on a visual effect of the user and have relatively simple adjustment manners.

Figure 4:
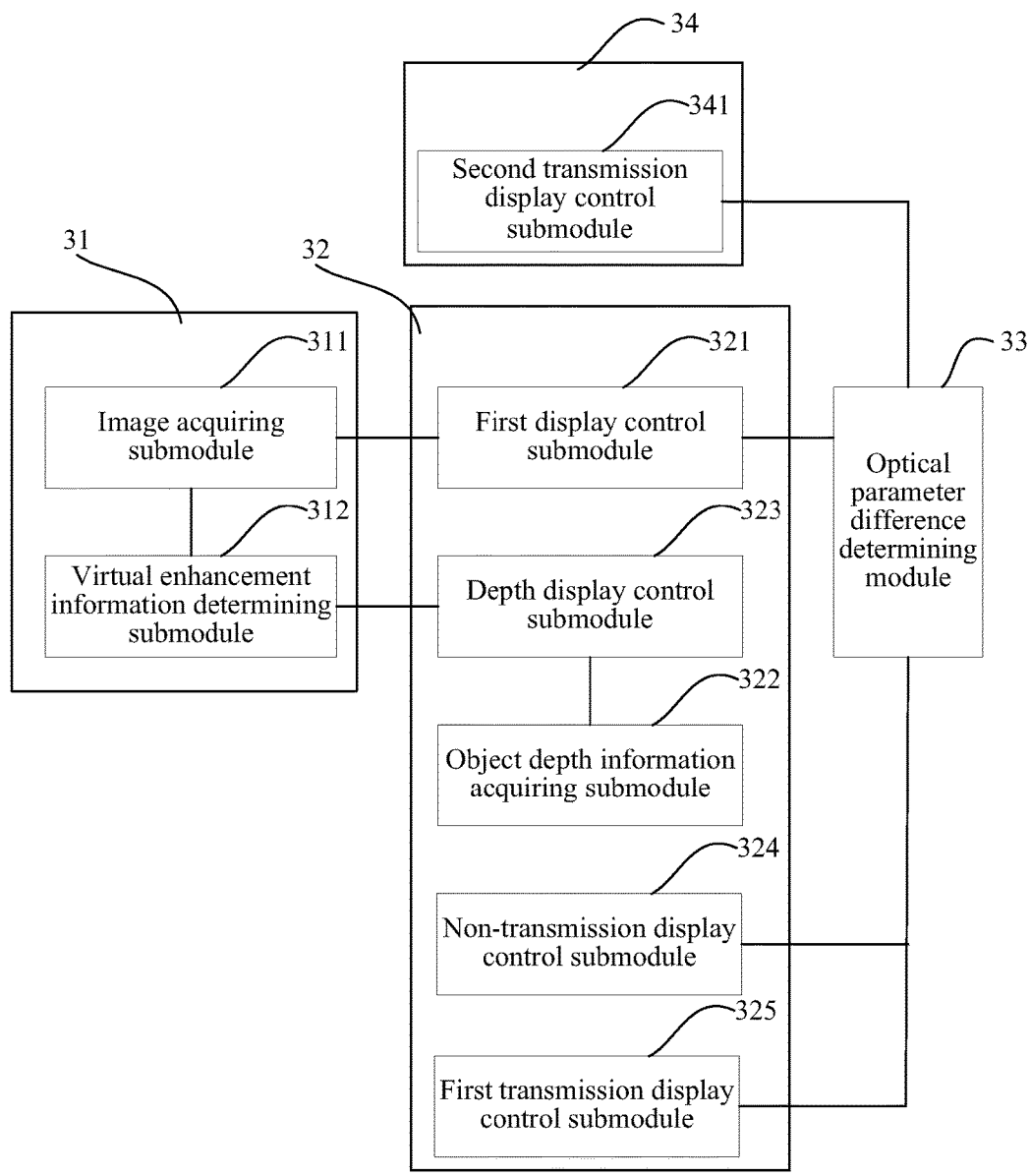
FIG. 4 is a logical block diagram of another display control apparatus according to an embodiment of the present application.

Optionally, as shown in FIG. 4, the display control apparatus also comprises an optical parameter difference determining module 33. The optical parameter difference determining module 33 is configured to determine the difference between the optical parameters of the virtual content and at least local optical parameters of the expected display environment. Accordingly, the first display control module 32 comprises a first display control submodule 321, and the first display control submodule 321 is configured to determine, responding to the difference of at least local expected display environment to exceed a preset permissible environment, at least local virtual enhancement information of the expected display environment according to optical parameters of the virtual content. In the solution, a comparison result between the optical parameters of the virtual content and at least optical parameters of the expected display environment is used as a triggering condition of displaying the at least local virtual enhancement information of the expected display or not in a process of displaying virtual content, to cause the solution to have greater pertinence, and meet practical application requirements on diversity.

Further optionally, the display control apparatus also comprises a second display control module 34 is configured to control, responding to the difference of the whole expected display environment to not exceed the preset permissible range, the display device to display the virtual content. In the solution, whether the virtual enhancement information of the expected display environment needs to be displayed or not can be determined according to actual demands, that is to say, display control is carried out according to actual demand discrimination, thereby a required fusion display effect is achieved with complexity as low as possible and a practical application requirement on diversity is met.

Optionally, the virtual enhancement information determining module 31 comprises: an image acquiring submodule 311 and a virtual enhancement information determining submodule 312. The image acquiring submodule 311 is configured to acquire at least local image of the expected display environment; the virtual enhancement information determining submodule 312 is configured to adjust optical parameters of the image according to the optical parameters of the virtual content, and the adjusted image is at least local virtual enhancement information of the expected display environment. The image displayed in this solution is equivalent to establishment of a virtual environment corresponding to at least local of the expected display environment, and optical parameters such as brightness, color temperature and/or saturation of the virtual environment are matched with the optical parameters of the virtual content to cause the virtual content saw by the user and the virtual environment presented by the image to be better integrally fused, and a fusion display effect and sense of reality are enhanced.

Optionally, the first display control module 32 comprises: an object depth information acquiring submodule 322 and a depth display control submodule 323. The object depth information acquiring submodule 322 is configured to acquire at least local object depth information of the expected display environment; and the depth display control submodule 323 is configured to control the display device to display the virtual content and respectively display respective parts, corresponding to the corresponding objects of the expected display environment, in the image to the corresponding depths according to the object depth information. In the solution, respective parts, corresponding to the corresponding objects of the expected display environment, in the image can be projected to depth positions of corresponding objects, in this way, the depth distribution of the objects displayed in the virtual environment and real depth distribution of the real objects in the expected display environment are close as much as possible or even same, to cause a visual effect of the virtual content saw by the user in the virtual environment to be just like that of the virtual content displayed in the expected display environment (real environment), in addition, since the optical parameters of the virtual environment are matched with the optical parameters of the virtual content, in terms of the display of the virtual content in the virtual environment, in a case of the visual effect of the user, a better fusion display effect is realized, and user experience is favorably improved.

The display device may be a far field display device (non-near-to-eye display device). Or, the display device may be a near-to-eye display device, and adoption of the near-to-eye display device causes the user to acquire a wider display range and relatively vivid visual effect.

Optionally, the difference of the optical parameters of the virtual content and the optical parameters of the expected display environment is determined, and the difference of at least local expected display environment is compared with a preset permissible range, and the display manner of the display device such as the near-to-eye display device can be switched according to a comparison result.

For example, the first display control module 32 comprises: a non-transmission display control submodule 324. The non-transmission display control submodule 324 is configured to control, responding to the difference of the whole expected display environment to exceed the preset permissible range, and control the near-to-eye display device to display the virtual content and the whole virtual enhancement information of the expected display environment by adopting a non-transmission display manner. The solution is equivalent to that the near-to-eye display device displays the virtual environment corresponding to the whole virtual enhancement information of the expected display environment and the virtual content, projection light of the two is overlapped at the user, while the light of the expected display environment does not enter human eyes, and the human eyes can see an immersive virtual reality display effect.

For another example, the first display control module 32 comprises: a first transmission display control submodule 325. The first transmission display control submodule 325 is configured to control, responding the local difference of the expected display environment to exceed the preset permissible environment, the near-to-eye display device to display the virtual content and the local virtual enhancement information of the expected display environment by adopting a transmission display manner. In the solution, compensation is performed on local optical parameters of the expected display environment through the virtual enhancement information to cause that in content saw by the user, the optical parameters of the virtual content are matched with the optical parameters of a real display environment (the environment after the virtual enhancement information is adopted to perform optical parameter compensation on the expected display environment) of the virtual content, thereby a fusion display effect is enhanced and user experience is improved.

For another example, the second display control module 34 comprises: a second transmission display control submodule 341. The second transmission display control submodule 341 is configured to control, responding to the whole difference of the expected display environment to not exceed the preset permissible range, the near-to-eye display device to display the virtual content in a transmission display manner. The solution is equivalent to that the near-to-eye display device displays the virtual content to the expected display environment (real environment), imaging light of the virtual content and real environment light of the expected display environment enter human eyes, and image at human fundus in an overlapping manner, thereby a reality-augmented display effect is acquired.

Figure 5:
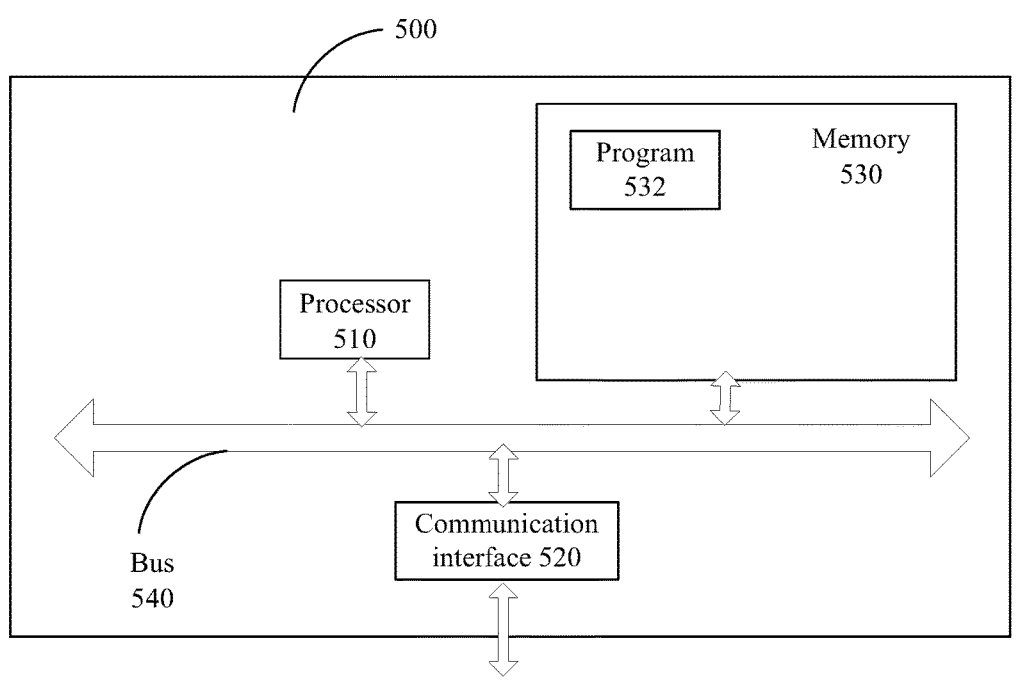
FIG. 5 is a logical block diagram of another display control apparatus according to an embodiment of the present application.

FIG. 5 is a structural block diagram of another display control apparatus according to an embodiment of the present application, and a specific implementation manner of the display control apparatus 500 is not limited by a specific embodiment of the present application. As shown in FIG. 5, the display control apparatus 500 may comprise:

a processor 510, a communication interface 520, a memory 530 and a communication bus 540, wherein, the processor 510, the communication interface 520, and the memory 530 communicate with one another by the communication bus 540.

The communication interface 520 is configured to communicate with a device with a communication function, an external light source and the like.

The processor 510 is configured to execute a program 532, which specifically executes related steps in the embodiments of any light field collection control method.

For example, the program 532 may comprise a program code, and the program code comprises a computer operation command.

The processor 510 may be a central processing unit (CPU), or an application specific integrated circuit (ASIC) or configured to implement one or more integrated circuits of the embodiments of the present application.

The memory 530 is configured to store the program 532. The memory 530 may comprise a random access memory (RAM), and may also comprise a non-volatile memory, such as at least one disk memory. For example, in one optional implementation manner, the processor 510 can execute the following steps by executing the program 532: determining at least local virtual enhancement information of an expected display environment of virtual content according to optical parameters of the virtual content; and controlling a display device to display the virtual content and the at least local virtual enhancement information of the expected display environment. In other optional implementation manners, the processor 510 can execute the steps mentioned in any other embodiment by executing the program 532, which is not repeated herein.

Specific implementation of each step in the program 532 refers to the corresponding description of corresponding steps, modules, submodules and units in foregoing embodiments, which is not repeated herein. A person of ordinary skill in the art can clearly understand that for convenient and brief description, a specific work process of the foregoing devices and modules may refer to the corresponding process description in the embodiments of the methods, which is not repeated herein.

In the foregoing embodiments of the present application, the serial number and/or sequence of the embodiments are only intended for the convenience of description, and do not represent inferiority or superiority of the embodiments. The description of each embodiment has a different focus. For any part of an embodiment not described in details, refer to relevant description of another embodiment. For relevant description of the implementation principle or process of apparatus, device or system embodiments, refer to records of relevant method embodiments, and the details are not described herein again.

A person of ordinary skill in the art may recognize that, the units, methods and procedures of each example described with reference to the embodiments disclosed herein, can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical

What is claimed is:

1. A display control method, comprising:
   determining at least local virtual enhancement information of an expected display environment of virtual content according to optical parameters of the virtual content, wherein the expected display environment is a real display environment where the virtual content is expected to be displayed, and the virtual enhancement information is a virtual environment corresponding to the expected display environment and established according to the optical parameters of the virtual content; and
   controlling a display device to display the virtual content and the at least local virtual enhancement information of the expected display environment.

2. The method of claim 1, further comprising:
   determining a first difference between the optical parameters of the virtual content and at least local optical parameters of the expected display environment;
   wherein determining the at least local virtual enhancement information of the expected display environment of the virtual content according to the optical parameters of the virtual content comprises determining, responding to the first difference exceeding a preset permissible range, the at least local virtual enhancement information of the expected display environment of the virtual content according to the optical parameters of the virtual content.

3. The method of claim 2, further comprising:
   determining a second difference between the optical parameters of the virtual content and whole optical parameters of the expected display environment; and
   controlling, responding to the second difference not exceeding the preset permissible range, the display device to display the virtual content.

4. The method of claim 1, wherein determining the at least local virtual enhancement information of the expected display environment of the virtual content comprises:
   acquiring at least a local image of the expected display environment; and
   adjusting optical parameters of the local image according to the optical parameters of the virtual content to generate an adjusted image, wherein the adjusted image is of the at least virtual enhancement information of the expected display environment of the virtual content.

5. The method of claim 4, wherein controlling the display device to display the virtual content and the at least local virtual enhancement information of the expected display environment comprises:
   acquiring at least local object depth information of the expected display environment; and
   controlling the display device to display the virtual content and respective parts corresponding to objects of the expected display environment in the local image at corresponding depths, wherein the corresponding depths are determined according to the at least local object depth information.

6. The method of claim 1, wherein the optical parameters comprise at least one of the following: brightness, color temperature, and saturation.

7. The method of claim 1, wherein the display device comprises a near-to-eye display device.

8. The method of claim 7, further comprising:
   determining a difference between the optical parameters of the virtual content and whole optical parameters of the expected display environment; and
   controlling, responding to the difference exceeding a preset permissible range, the near-to-eye display device to display the virtual content and whole virtual enhancement information of the expected display environment by a non-transmission display manner.

9. The method of claim 7, further comprising:
determining a difference between the optical parameters of the virtual content and whole optical parameters of the expected display environment; and
controlling, responding to the difference not exceeding a preset permissible range, the near-to-eye display device to display the virtual content by a transmission display manner.

10. The method of claim 7, further comprising:
determining a difference between the optical parameters of the virtual content and at least local optical parameters of the expected display environment; and
controlling, responding to the difference exceeding a preset permissible range, the near-to-eye display device to display the virtual content and the at least local virtual enhancement information of the expected display environment by a transmission display manner.

11. A display control apparatus, comprising:
a virtual enhancement information determining module configured to determine at least local virtual enhancement information of an expected display environment of virtual content according to optical parameters of the virtual content, wherein the expected display environment is a real display environment where the virtual content is expected to be displayed, and the virtual enhancement information is a virtual environment corresponding to the expected display environment and established according to the optical parameters of the virtual content; and
a first display control module configured to control a display device to display the virtual content and the at least local virtual enhancement information of the expected display environment.

12. A non-transitory computer-readable storage medium configured with instructions executable by one or more processors to cause the one or more processors to perform operations comprising:
determining at least local virtual enhancement information of an expected display environment of virtual content according to optical parameters of the virtual content, wherein the expected display environment is a real display environment where the virtual content is expected to be displayed, and the virtual enhancement information is a virtual environment corresponding to the expected display environment and established according to the optical parameters of the virtual content; and
controlling a display device to display the virtual content and the at least local virtual enhancement information of the expected display environment.

13. A display control apparatus, comprising:
a processor; and
a memory configured to store instructions executable by the processor to cause the processor to perform operations including:
determining at least local virtual enhancement information of an expected display environment of virtual content according to optical parameters of the virtual content, wherein the expected display environment is a real display environment where the virtual content is expected to be displayed, and the virtual enhancement information is a virtual environment corresponding to the expected display environment and established according to the optical parameters of the virtual content; and
controlling a display device to display the virtual content and the at least local virtual enhancement information of the expected display environment.

14. The apparatus of claim 13, wherein the operations further comprises:
determining a first difference between the optical parameters of the virtual content and at least local optical parameters of the expected display environment; and
determining, responding to the difference exceeding a preset permissible environment, the at least local virtual enhancement information of the expected display environment of the virtual content according to optical parameters of the virtual content.

15. The apparatus of claim 14, wherein the operations further comprises:
determining a second difference between the optical parameters of the virtual content and whole optical parameters of the expected display environment; and
controlling, responding to the second difference not exceeding the preset permissible range, the display device to display the virtual content.

16. The apparatus of claim 13, wherein, the operations further comprises:
acquiring at least a local image of the expected display environment; and
adjusting optical parameters of the local image according to the optical parameters of the virtual content to generate an adjusted image, wherein the adjusted image is of at least local virtual enhancement information of the expected display environment of the virtual content.

17. The apparatus of claim 16, wherein the operations further comprises:
acquiring at least local object depth information of the expected display environment; and
controlling the display device to display the virtual content and respective parts corresponding to objects of the expected display environment in the local image at corresponding depths, wherein the corresponding depths are determined according to the at least local object depth information.

18. The apparatus of claim 13, wherein the optical parameters comprise at least one of the following: brightness, color temperature, and saturation.

19. The apparatus of claim 13, wherein the display device comprises a near-to-eye display device.

20. The apparatus of claim 19, wherein the operations further comprises:
determining a difference between the optical parameters of the virtual content and whole optical parameters of the expected display environment; and
controlling, responding to the difference exceeding a preset permissible range, the near-to-eye display device to display the virtual content and whole virtual enhancement information of the expected display environment by a non-transmission display manner.

21. The apparatus of claim 19, wherein the operations further comprises:
determining a difference between the optical parameters of the virtual content and whole optical parameters of the expected display environment; and
controlling, responding to the difference exceeding a preset permissible range, the near-to-eye display device to display the virtual content and the at least local virtual enhancement information of the expected display environment by a transmission display manner.

22. The apparatus of claim 19, wherein the operations further comprises:

determining a difference between the optical parameters of the virtual content and at least local optical parameters of the expected display environment; and controlling, responding to the difference not exceeding a preset permissible range, the near-to-eye display device to display the virtual content by a transmission display manner.

* * * * *